United States Patent
Nakano

(10) Patent No.: US 7,513,641 B2
(45) Date of Patent: Apr. 7, 2009

(54) SURFACE LIGHT EMISSION DEVICE INCLUDING A PLURALITY OF UNIT REFLECTORS

(75) Inventor: Koji Nakano, Komatsushima (JP)

(73) Assignee: Nichia Corporation, Anan-Shi, Tokushima (JP)

( * ) Notice: Subject to any disclaimer, the term of this patent is extended or adjusted under 35 U.S.C. 154(b) by 231 days.

(21) Appl. No.: 11/501,061

(22) Filed: Aug. 9, 2006

(65) Prior Publication Data
US 2007/0035968 A1    Feb. 15, 2007

(30) Foreign Application Priority Data
Aug. 10, 2005   (JP) .................. P2005-232378

(51) Int. Cl.
G09F 13/04   (2006.01)
F21V 1/00   (2006.01)

(52) U.S. Cl. ......................... 362/241; 362/97

(58) Field of Classification Search ................ 362/236, 362/238, 240, 241, 97
See application file for complete search history.

(56) References Cited

U.S. PATENT DOCUMENTS

| 4,254,453 | A | * | 3/1981 | Mouyard et al. | ............ 362/240 |
| 5,660,461 | A | * | 8/1997 | Ignatius et al. | .............. 362/241 |
| 5,924,785 | A | * | 7/1999 | Zhang et al. | ................ 362/241 |
| 7,008,079 | B2 | * | 3/2006 | Smith | ......................... 362/235 |
| 7,350,942 | B2 | * | 4/2008 | Chen et al. | ................... 362/347 |
| 7,354,178 | B2 | * | 4/2008 | Han et al. | .................... 362/304 |

* cited by examiner

Primary Examiner—Sandra O'Shea
Assistant Examiner—James W Cranson
(74) Attorney, Agent, or Firm—Birch, Stewart, Kolasch & Birch, LLP

(57) ABSTRACT

A surface light emission apparatus for a backlight of large size that achieves surface light emission with uniform luminance is provided.

The surface light emission apparatus comprises a plurality of light sources arranged in a matrix configuration, a sheet disposed opposite to the plurality of light sources so as to transmit a part of light emitted by the light sources and reflect the rest of light, and a reflector plate disposed between the adjacent light sources, wherein the reflector plate has a plurality of unit reflectors each of which is installed so as to surround one of the light sources, and each unit reflector has a curved surface that has a focal point located on or near the central axis of the corresponding light source along which the emitted light has the maximum intensity.

20 Claims, 3 Drawing Sheets

SURFACE LIGHT EMISSION DEVICE INCLUDING A PLURALITY OF UNIT REFLECTORS

BACKGROUND OF THE INVENTION

1. Field of the Invention

The present invention relates to a surface light emission apparatus, for example, a surface light emission apparatus used as the backlight for liquid crystal display.

2. Description of the Related Art

In recent years, the surface light emission apparatus constituted from a plurality of light emitting diodes have been developed, and has come to be widely used as the backlight for liquid crystal display of relatively small size in such applications as cellular phones. Research and development efforts have also been made to commercialize a backlight constituted from light emitting diodes for a very large liquid crystal display panel for television receiver.

However, while a backlight constituted from light emitting diodes used in a very large liquid crystal display panel for television has an advantage of wide range of color reproduction, it has a problem of unevenness in luminance distribution which makes it difficult to achieve surface light emission with uniform luminance.

SUMMARY OF THE INVENTION

Accordingly, an object of the present invention is to provide a surface light emission apparatus for a backlight of large size that achieves surface light emission with uniform luminance.

In order to achieve the object described above, the surface light emission apparatus of the present invention comprises a plurality of light sources arranged in a matrix configuration, a sheet disposed opposite to the plurality of light sources so as to transmit a part of light emitted by the light sources and reflect the rest of light, and a reflector plate disposed between the adjacent light sources, wherein the reflector plate is constituted from a collection of unit reflectors each of which is installed so as to surround one of the light sources, and each unit reflector has a curved surface that has a focal point located on or near the central axis of the corresponding light source along which the emitted light has the maximum intensity.

In the surface light emission apparatus of the present invention that is constituted as described above, since the reflector plate is a collection of unit reflectors each of which being installed so as to surround the corresponding one of the light sources, and each unit reflector has a curved surface that has focal point on or near the central axis of the corresponding light source, uniformity of emitted light intensity within the light emitting surface can be improved by making use of the light reflected on the sheet.

DESCRIPTION OF THE PREFERRED EMBODIMENTS

The surface light emission apparatus for backlight according to one embodiment of the present invention will now be described with reference to the accompanying drawings.

Figure 1:
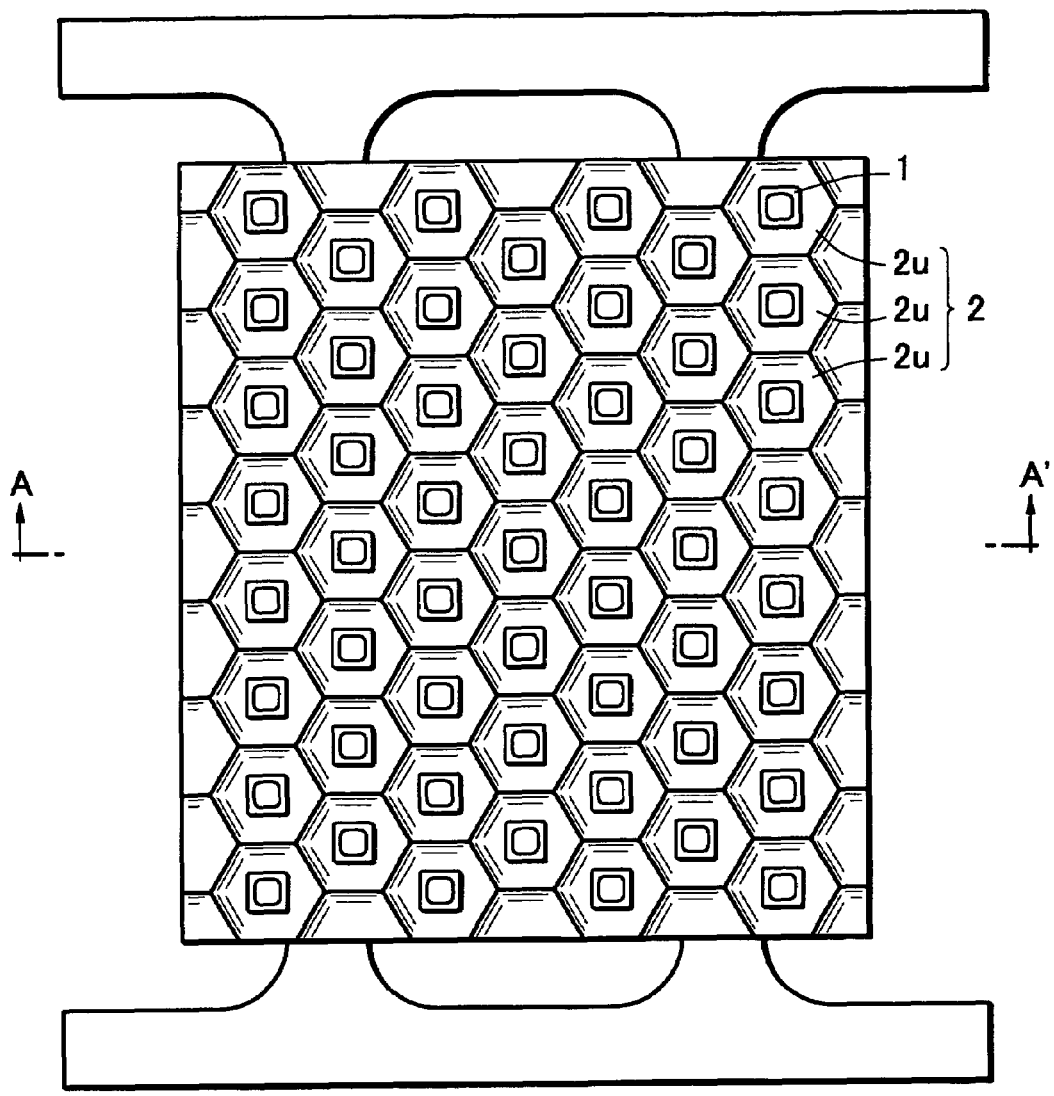
FIG. 1 is a plan view showing the arrangement of the light emitting diodes and the unit reflectors in the surface light emission apparatus according to this embodiment of the present invention.
Figure 2:
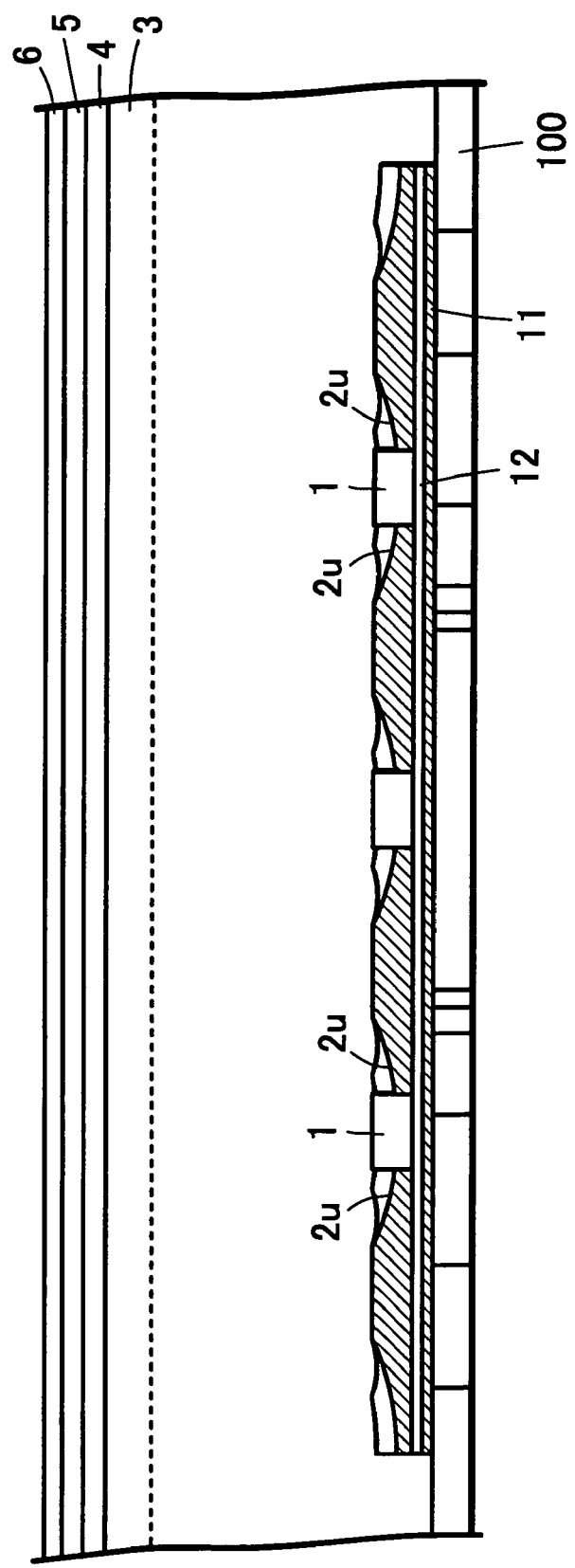
FIG. 2 is a sectional view taken along lines A-A' in FIG. 1 of the surface light emission apparatus according to this embodiment of the present invention.

FIG. 1 is a plan view of the surface light emission apparatus of this embodiment. FIG. 2 is a sectional view taken along lines A-A' in FIG. 1. FIG. 3 is a schematic sectional view showing an enlarged part of FIG. 2 for the explanation of the principle of the present invention.

The surface light emission apparatus of this embodiment is used as the backlight of a large liquid crystal display such as liquid crystal television, for example, and is constituted from a number of light emitting diodes 1 disposed in a predetermined arrangement as shown in FIG. 1

Specifically, in the surface light emission apparatus of this embodiment, the plurality of light emitting diodes 1 are disposed in a predetermined arrangement on a substrate 12. The substrate 12 whereon the light emitting diodes 1 are arranged is installed, for example via an aluminum plate 11, at the bottom of a chassis 100. The aluminum plate 11 is provided for the purpose of heat dissipation and reinforcement and fixation of the mounting substrate.

In the surface light emission apparatus of this embodiment, a diffusion sheet 4, a prism sheet 5 and a polarization filter 6 are provided to oppose the light emitting diodes 1 which are disposed in an arrangement. Specifically, the diffusion sheet 4, the prism sheet 5 and the polarization filter 6 are mounted in this order on a support plate 3 made of, for example, acrylic resin disposed at a predetermined distance from the substrate 12.

The diffusion sheet 4 has a function of diffusing the light emitted by the light source (light emitting diode) so as to deflect the direction of light propagation and prevent moire fringes from occurring, and is formed from, for example, polypropylene (PP), polyethylene (PE), polymethyl methacrylate (PMMA), polycarbonate (PC) or polyethylene terephthalate (PET).

The prism sheet 5 has a function to collect the emitted light so as to converge into the normal direction so as to increase the luminance right at the front, and is made by forming tiny prisms at predetermined intervals over the entire surface on one side of a sheet formed from, for example, polypropylene (PP), polyethylene (PE), poly-methyl methacrylate (PMMA), polycarbonate (PC) or polyethylene terephthalate (PET).

The polarization filter 6 is provided so as to assist the liquid crystal panel that transmits only linearly polarized light propagating in a particular direction.

The surface light emission apparatus has unit reflectors 2u each provided to surround corresponding one of the light emitting diodes 1. A collection of the unit reflectors 2u constitute the reflector plate 2. The reflector plate 2 improves the efficiency of extracting light in the normal direction, and improves the uniformity of distribution of light intensity across the light emitting surface.

That is, according to the present invention, direction and shape of the surface at the unit reflector 2u are set so that distribution of intensity across the surface of the light emitted from the surface via the polarization filer 6 becomes uniform.

Figure 3A:
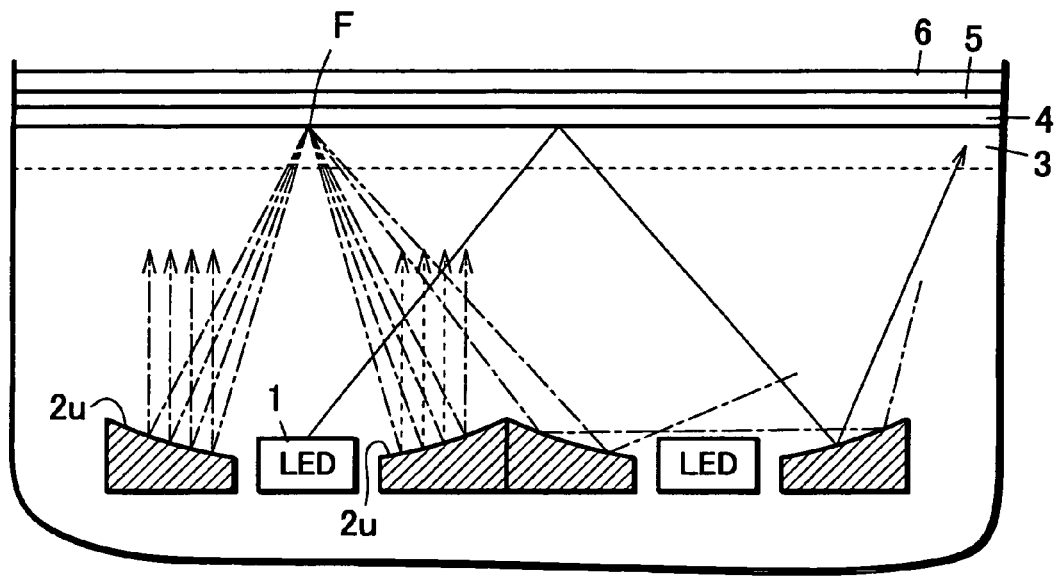
FIG. 3A is a schematic sectional view explanatory of the principle of the present invention, showing a part of FIG. 2 in enlarged view.

FIG. 3A is a schematic sectional view explanatory of the principle of the present invention, showing a case in which the focal point of each of the unit reflectors 2u is located at the intersect of the central axis of the light emitting diode and the surface 4a of the diffusion sheet 4.

Figure 3B:
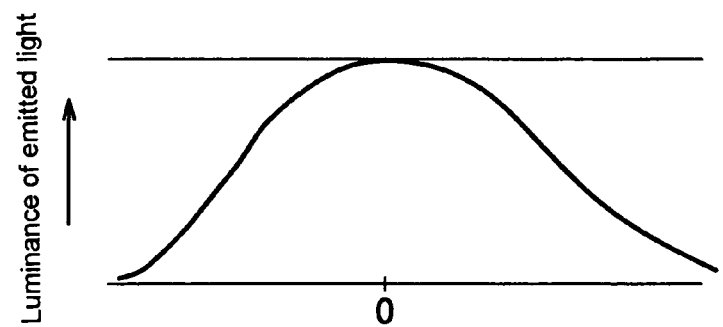
FIG. 3B is a graph schematically showing the distribution of luminance of emitted light across the light emitting surface without unit reflectors.

A light emitting diode generally has directivity of light emission, so that light intensity is highest in the direction of the central axis. As a result, in case the reflector 2 of the present invention is not provided, luminance becomes uneven across the light emitting surface as schematically shown in FIG. 3B. Accordingly the present invention employs such a constitution that light reflected back by the diffusion sheet 4 or other is reflected in directions toward points that are offset from the central axis of the light emitting diode, so as to make up for the insufficient light intensity at points offset from the central axis where luminance is low, thereby improving the uniformity of luminance distribution.

In the example shown in FIG. 3A, directivity of the light emitting diode causes intense light to be directed in and around the central axis. As a result, light rays formed by the light propagating in directions near the central axis and reflected on the surface of the diffusion sheet 4 also have relatively high intensity. In this embodiment, light that has been reflected back with relatively high intensity is reflected on the unit reflector, so as to make up for the insufficient light intensity at points that are offset from the central axis of the light emitting diode where luminance is low, thereby improving the uniformity of luminance distribution across the light emitting surface. The shaded area in FIG. 3C is a schematic representation of the light intensity added as a complement to achieve uniform luminance distribution.

Figure 3C:
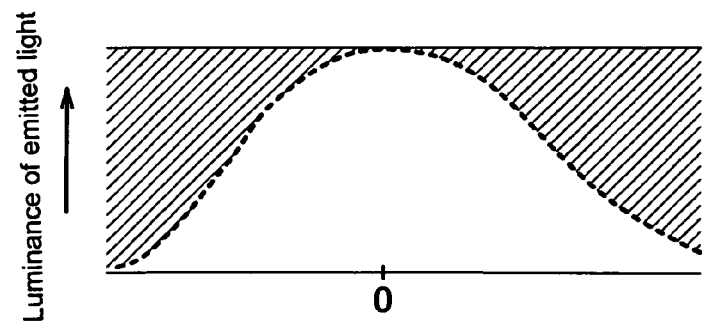
FIG. 3C is a graph schematically showing the distribution of luminance of emitted light across the light emitting surface provided with the unit reflectors (constitution of the present invention).

FIG. 3B and FIG. 3C schematically show the luminance distribution around one of the light emitting diodes 1 and the corresponding unit reflector 2u, assuming that the light emitting diode is located at the origin (O).

As will be apparent from the description given above, each of the unit reflector 2u of the present invention is preferably formed to have such a surface (paraboloid of revolution) that has a focal point located on a surface that reflects the largest part of the light emitted by the light emitting diode 1, among the diffusion sheet 4, the prism sheet 5 and the polarization filter 6 which are disposed above on the central axis of the light emitting diode.

In the surface light emission apparatus of the present invention, the reflector plate 2 is preferably constituted from a plurality of unit reflectors 2u disposed side by side without gap therebetween, so as to effectively reflect the light that has been reflected back thereto and efficiently utilize the light.

In order to dispose the plurality of unit reflectors 2u without gap therebetween, the unit reflectors 2u are formed in, for example, triangular, rectangular or hexagonal shape in the plan view projected onto the surface of the support plate 3 (hereinafter referred to as planar shape of projection).

In the surface light emission apparatus according to this embodiment of the present invention, as described above, uniformity of emitted light intensity within the light emitting surface can be improved by providing the single reflector plate 2 as a collection of the unit reflectors 2u.

Also in the surface light emission apparatus according to this embodiment, efficiency of utilizing the light can be improved by constituting the single reflector plate 2 from the unit reflectors 2u that are disposed close to each other without gap therebetween.

The efficiency of utilizing the light is the proportion of the amount of light that can be extracted from the light emitting surface to the total amount of light emitted by the light emitting diode 1.

A method for manufacturing the surface light emission apparatus of this embodiment will now be described.

First, leadless solder, for example, is applied to the substrate 12 by screen printing. With light emitting diodes placed on the solder, the substrate is put in a reflow furnace to carry out solder reflow. The reflow process is carried out, for example, with preheating temperature set in a range from 180 to 200° C., soldering temperature of 260° C. or lower and duration of 10 seconds. The light emitting diodes are thus mounted on the substrate 12.

A heat dissipation sheet (not shown) is placed on the aluminum plate 11, and the substrate 12 is placed thereon. The members which have been assembled so far have through holes for screws formed at corresponding positions thereof while the aluminum plate 11 has tapped holes, so that the members are held together by means of screws inserted from the side of the substrate 12 at this stage.

Then the reflector plate 2 formed by integrating the plurality of unit reflectors 2u is placed on the substrate 12 on the side where the light emitting diodes are mounted, so that each light emitting diode is surrounded by the corresponding unit reflector 2u. The reflector plate 2 formed by integrating the plurality of the unit reflectors 2u can be manufactured, for example, by injection molding of a thermoplastic resin that has high grade of light reflectivity.

The reflector plate 2 is held onto other members by screwing through holes other than those of the screws described above, thereby forming a single light source including the reflector plate 2.

Thus the surface light emission apparatus of this embodiment is manufactured.

What is claimed is:

1. A surface light emission apparatus comprising:
   a plurality of light sources arranged in a matrix configuration;
   a sheet disposed opposite to the plurality of light sources so as to transmit a part of light emitted by the light sources and reflect the rest of light; and
   a reflector plate disposed between the adjacent light sources,
   wherein the reflector plate has a plurality of unit reflectors each of which is installed so as to surround one of the light sources, and each unit reflector has a curved surface that has a focal point located on or near a central axis of the corresponding light source along which the emitted light has a maximum intensity, and one of said focal points is located on a surface included in said sheet.

2. The surface light emission apparatus according to claim 1;
   wherein each of said focal points is located at a intersection of the central axis and the sheet.

3. The surface light emission apparatus according to claim 1;
   wherein said light sources are arranged so that all of the spaces between the adjacent light sources are equal,
   wherein a projection view of each of said unit reflectors projected onto the surface of support plate is one selected from a group consisting of triangular, rectangular and hexagonal shape.

4. The surface light emission apparatus according to claim 2;
   wherein said light sources are arranged so that all of the spaces between the adjacent light sources are equal, wherein a projection view of each of said unit reflectors projected onto the surface of support plate is one selected from a group consisting of triangular, rectangular and hexagonal shape.

5. The surface light emission apparatus according to claim 1, wherein said sheet is a diffusion sheet, or a prism sheet, or a polarization filter.

6. The surface light emission apparatus according to claim 5, wherein said surface is a surface that reflects the largest part of the light emitted by one of said light sources, said surface being a part of said diffusion sheet, or of said prism sheet, or of said polarization filter disposed above on the central axis of said one light source.

7. The surface light emission apparatus according to claim 5, wherein said sheet is a diffusion sheet which diffuses the light emitted by said plurality of light sources so as to deflect a direction of light propagation and prevent Moire fringes from occurring.

8. The surface light emission apparatus according to claim 1,
wherein said sheet is a diffusion sheet, and
further comprising a prism sheet disposed further away from said light sources than said sheet, said prism sheet having a function to collect emitted light so as to converge into a normal direction so as to increase a luminance, said prism sheet including prisms at predetermined intervals.

9. The surface light emission apparatus according to claim 1,
wherein said sheet is a diffusion sheet, and
further comprising a polarization filter disposed further away from said light sources than said sheet, said polarization filter assisting in transmitting linearly polarized light propagating in a particular direction.

10. The surface light emission apparatus according to claim 1, wherein light reflected back by said sheet is reflected by said reflector plate in directions toward points that are offset from a central axis of one of said light sources, so as to make up for an insufficient light intensity at points offset from said central axis.

11. The surface light emission apparatus according to claim 1, wherein a light source corresponding to said one focal point emits intense light directed in and around a central axis associated with said light source, and light rays formed by light reflected back by a unit reflector associated with said one focal point are reflected back with relatively high intensity.

12. The surface light emission apparatus according to claim 1,
wherein said sheet is a diffusion sheet, and
further comprising
a prism sheet disposed further away from said light sources than said sheet, and
a polarization filter disposed further away from said light sources than said prism sheet.

13. The surface light emission apparatus according to claim 1, wherein said reflector plate improves an efficiency of extracting light in a direction normal to said matrix configuration, and improves a uniformity of distribution of light intensity across a light emitting surface of said apparatus.

14. The surface light emission apparatus according to claim 1, wherein said surface is a bottom surface of said sheet.

15. The surface light emission apparatus according to claim 1, wherein said unit reflectors are disposed without a gap therebetween.

16. The surface light emission apparatus according to claim 1, wherein said surface light emission apparatus is used as a backlight of a large liquid crystal display.

17. The surface light emission apparatus according to claim 1, further comprising a substrate and a plate, wherein said plurality of light sources are disposed on said substrate, said substrate is installed on said plate, and said plate dissipates heat.

18. The surface light emission apparatus according to claim 1, wherein said sheet is formed from polypropylene (PP), polyethylene (PE), polymethyl methacrylate (PMMA), polycarbonate (PC) or polyethylene terephthalate (PET).

19. The surface light emission apparatus according to claim 1, wherein said one focal point is located at an intersection of said sheet and a central axis of one of said light sources.

20. The surface light emission apparatus according to claim 1, wherein said reflector plate is formed by injection molding of a thermoplastic resin with a high grade of light reflectivity.

* * * * *